United States Patent [19]
Gutgsell

[11] Patent Number: 6,137,057
[45] Date of Patent: Oct. 24, 2000

[54] ELECTRICAL RACEWAY ASSEMBLY

[75] Inventor: David R. Gutgsell, Jasper, Ind.

[73] Assignee: Ditto Sales, Inc., Jasper, Ind.

[21] Appl. No.: 09/082,128

[22] Filed: May 20, 1998

[51] Int. Cl.[7] .................................................. H02G 3/00
[52] U.S. Cl. ........................................ 174/101; 174/68.3
[58] Field of Search ................................ 174/68.1, 68.3, 174/95, 96, 97, 98, 100, 101

[56]       References Cited

U.S. PATENT DOCUMENTS

| | | | |
|---|---|---|---|
| 3,786,171 | 1/1974 | Shira ........................................ | 174/48 |
| 4,017,137 | 4/1977 | Parks . | |
| 4,188,765 | 2/1980 | Jackson . | |
| 4,277,123 | 7/1981 | Haworth et al. . | |
| 4,370,008 | 1/1983 | Haworth et al. . | |
| 4,372,629 | 2/1983 | Propst et al. . | |
| 4,377,724 | 3/1983 | Wilson . | |
| 4,382,986 | 5/1983 | Reuben . | |
| 4,406,101 | 9/1983 | Heidmann ................................ | 52/220 |
| 4,594,826 | 6/1986 | Gray . | |
| 4,717,358 | 1/1988 | Chaundy . | |
| 4,762,072 | 8/1988 | Boundy et al. . | |
| 4,792,881 | 12/1988 | Wilson et al. . | |
| 4,874,322 | 10/1989 | Dola et al. . | |
| 4,918,886 | 4/1990 | Benoit et al. . | |
| 5,024,614 | 6/1991 | Dola et al. . | |
| 5,091,607 | 2/1992 | Stob ........................................ | 174/48 |
| 5,092,786 | 3/1992 | Juhlin et al. . | |
| 5,092,787 | 3/1992 | Wise et al. . | |
| 5,231,562 | 7/1993 | Pierce et al. . | |
| 5,244,401 | 9/1993 | Russell et al. . | |
| 5,336,097 | 8/1994 | Williamson et al. . | |
| 5,373,108 | 12/1994 | Ysbrand . | |
| 5,451,101 | 9/1995 | Ellison et al. . | |
| 5,694,726 | 12/1997 | Wu ........................................ | 52/287.1 |
| 5,704,175 | 1/1998 | Lewis . | |
| 5,728,976 | 3/1998 | Santucci et al. ........................ | 174/135 |
| 5,877,451 | 3/1999 | Zimmerman ............................ | 174/68.3 |

*Primary Examiner*—Kristine Kincaid
*Assistant Examiner*—W. David Walkenhorst
*Attorney, Agent, or Firm*—Baker & Daniels

[57]         ABSTRACT

An electrical raceway assembly for use with a structure is provided, including an elongated raceway engageable to the structure and having a length, a transverse base and a pair of opposite upstanding sidewalls extending along the length to define at least one channel configured for retaining electrical wires. A cover attachable to the raceway to occlude a portion of the channel is included. The cover includes an elongated face plate having an interior surface and an exterior surface. The face plate has a first portion and an opposite second portion. The cover is configured for snap fit engagement with the raceway. One end of the cover is rotatable, about a longitudinal axis of the raceway, between an open position in which a portion of a channel of the raceway is exposed and a closed position in which the other end of the cover is engaged to the raceway. A flange extends from one of the portions of the cover. The flange is relatively more flexible other elements of the cover and occludes an area behind the flange when the cover is attached to the raceway and the flange being elastically deformable to allow access to the area.

31 Claims, 13 Drawing Sheets

6,137,057

ELECTRICAL RACEWAY ASSEMBLY

FIELD OF THE INVENTION

The present invention relates to the electrification of structures, particularly office furniture and partitions, dividers and panels used to form office cubicles. Specifically, the invention concerns electrical raceway systems and covers for raceways to shield cables and wires housed within.

BACKGROUND OF THE INVENTION

As the cost of doing business has increased due to increases in costs of personnel, insurance, office space and the like, a trend for downsizing has developed. This trend along with the expanding presence of small businesses has created a pressure for economy in the workplace. Part of this economy is that a space may be required to fulfill more than one role. At the same time, an awareness of the effects of office aesthetics on morale and productivity has created a desire for pleasant and efficient workspaces. To meet these needs, attractive yet portable training, conference and office furniture is marketed by Versteel, P.O. Box 850, Jasper, Ind. 47547 (800-876-2120). Also, in many cases, open office plans must be divided into individual offices or workstations. Many arrangements are available to divide an open office space, including partition panels, systems furniture, and modular furniture.

Such workstations typically require specific features for maximum functionality: power supply, communication ports and keyboard or other support tools. However, in open office space, work structures may be placed in locations that are not easily accessible to the office space electrical and communication ports. Therefore, one challenge with providing power supply and communication access to the desk top of each workstation is wire management. Improper wire management can lead to interruptions in service, workplace hazards and poor aesthetics.

There is a growing need for improved components and systems for accommodating the distribution of electrical power along or in structures. Examples of electrical systems in office furniture panels and modular wall units are disclosed in U.S. Pat. Nos. 4,370,008, 5,231,562 and 5,451,101. Such systems include raceway enclosures for guiding electrical and communication wires from wall outlets to workstation structures. The raceway system facilitates the extension of both electrical and communication cables along the system in an efficient yet hidden manner, while permitting desired utilization of these cables at selected locations.

In spite of the benefits of such raceway systems, a need has remained for systems that improve the usability, flexibility, dependability, appearance and convenience of such raceway systems, particularly when used with tables or desks.

SUMMARY OF THE INVENTION

Briefly describing one aspect of the invention, an electrical raceway assembly for use with a structure is provided. The assembly includes an elongated raceway engageable to the structure and having a length, a transverse base and a pair of opposite upstanding sidewalls extending along the length to define at least one channel configured for retaining electrical wires. A cover is attachable to the raceway to occlude a portion of the channel. The cover includes an elongated face plate having an interior surface and an exterior surface. The face plate has a first portion and an opposite second portion, each portion extending along a length of the face plate. Attachment means are provided for attaching the first and second portions of the face plate to each of the opposite upstanding sidewalls with the interior surface facing the channel.

A flange extends from one of the portions of the cover plate and occludes an area behind the flange when the cover is attached to the raceway. The flange is relatively more flexible than the other elements of the cover and elastically deformable to allow access to the area. In some embodiments, the flange has a lower durometer than the other elements of the cover, such as the face plate or attachment means. In certain embodiments, the flange is integral with the face plate. In other embodiments the flange is adjacent the second portion and the face plate and is recessed to the face plate.

In another embodiment, one of the side walls of the raceway terminates in a lip, which includes a rounded surface having a radius. The attachment means of the cover includes a groove defined in the first portion that is configured for snap fit engagement with the lip. In some embodiments, a second of the side walls of the raceway terminates in an elongated attachment receptacle and the attachment means of the cover includes a rounded edge of the second portion that is receivable within the attachment receptacle. The rounded edge is configured for snap fit engagement within the receptacle. In specific embodiments the attachment receptacle defines a curved interior portion having an internal radius slightly larger than the radius of the rounded edge for mating with the rounded edge. In another aspect of the invention, the attachment means includes a hinge feature. The rounded edge of the second portion is rotatingly receivable within the attachment receptacle so that the cover is rotatable, about a longitudinal axis of the attachment receptacle, between an open position in which a portion of a channel of the raceway is exposed and a closed position in which the first portion is engaged to the raceway.

Accordingly, it is one object of the invention to provide improved electrical raceway systems for work spaces. These and other objects, advantages and features are accomplished according to the devices and assemblies of the present invention.

DESCRIPTION OF THE PREFERRED EMBODIMENTS

Figure 1:
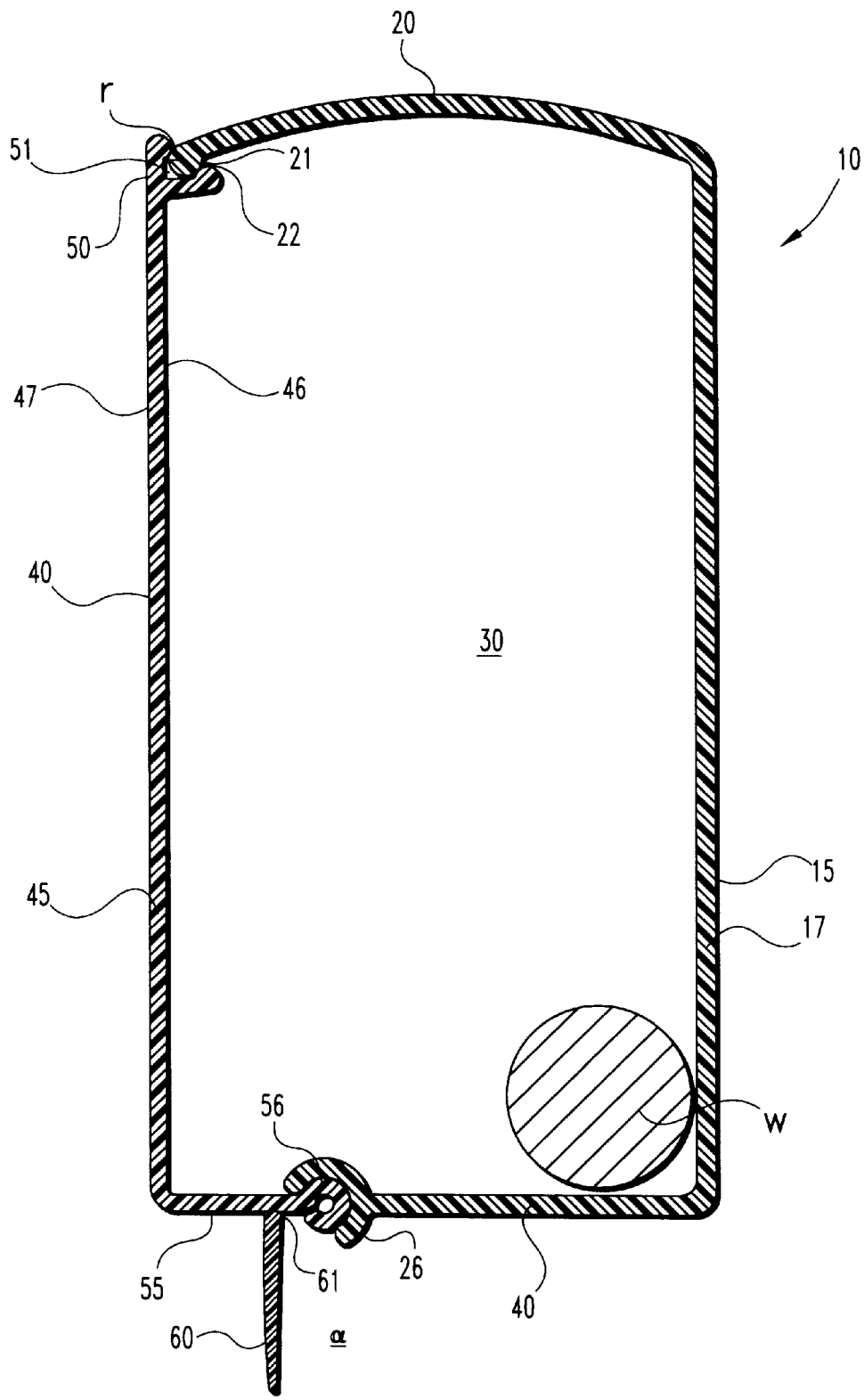
FIG. 1 is side sectional view of an electrical raceway assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The present invention provides electrical raceway systems and covers for raceways that enhance the functionality and aesthetics of workspaces. The covers are engageable to the raceways in a snap fit engagement that provides secure placement of the cover and allows removal if access to the entire raceway is required. The covers are provided with a pliable flange that occludes an area behind the cover yet allows convenient access to the area for storing electrical cords and the like.

An electrical raceway assembly 10 for attachment to a structure in accordance with a preferred embodiment of the present invention is depicted in FIGS. 1–5. The system 10 includes an elongated raceway 15 engageable to a structure (not shown), such as a desk, table, wall, panel or the like. The raceway 15 has a length L, which preferably extends along a length of the structure to provide power or communication ports at various locations along the structure. The raceway 15 includes a transverse base wall 17 and a pair of opposite upstanding sidewalls 20, 25 extending along the length L of the raceway 15. The walls 17, 20, 25 define a channel 30 configured for retaining and guiding electrical and communication wires W along the length L of the raceway 15. In the embodiment shown in FIG. 1, the channel 30 is U-shaped.

The raceway assembly 10 also includes a cover 40 attachable to the raceway 15 to occlude at least a portion of the channel 30 to shield or protect the contents of the raceway 15 and provide a pleasing appearance to the assembly 10. The cover 40 includes an elongated face plate 45 having an interior surface 46 and an exterior surface 47. The cover face plate 45 also has a first portion 50 and an opposite second portion 55. Each of the portions 50, 55 extend along a length l of the face plate 45. The length l of the face plate 45 may be equal or substantially equal to the length L of the raceway 15 to protect the enclosed wires W and provide a streamlined and aesthetically pleasing appearance to the structure. In some applications it may be desirable to provide several covers 40 for a raceway 15 if the raceway 15 is too long for a single cover 40 to be manageable and convenient.

Attachment means are also provided for attaching the cover 40 to the raceway 15. Preferably, the first and second portions 50, 55 of the face plate 45 are attachable to each of the opposite upstanding sidewalls 20, 25 so that the interior surface 46 faces the channel 30. The cover 40 is preferably configured for snap fit engagement with the raceway 15. For example, as shown in FIGS. 1 and 4, one of the sidewalls 20 terminates in a lip 21. The lip 21 includes a rounded surface 22 having a radius $r_l$. The lip 21 is configured for mating engagement with attachment means on the first portion 50. In the embodiment shown in FIGS. 1 and 3, the attachment means includes a groove 51 defined in the first portion 50. The groove 51 is configured for snap fit engagement with the lip 21. In one specific embodiment, the attachment means includes an arm 52 that extends along the length l of the cover 40 and along with the first portion 50 defines the groove 51. In preferred embodiments, the first portion 50 and the arm 52 each terminate in a rounded edge 51a, 52a, respectively to facilitate engagement of the lip 21.

Figure 3:
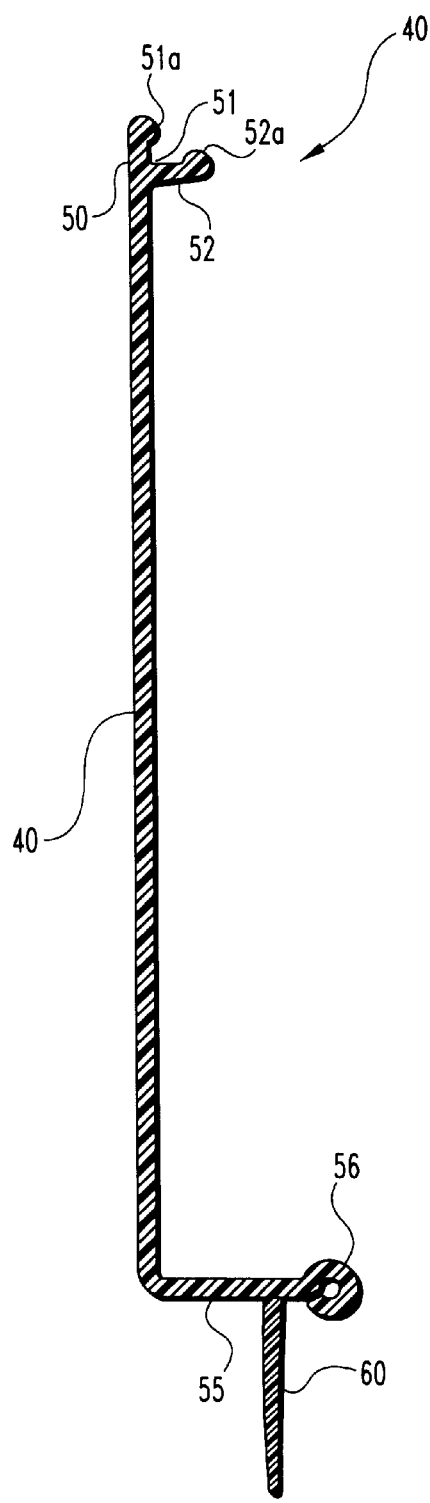
FIG. 3 is a side elevational view of a cover for an electrical raceway according to one embodiment of the present invention.
Figure 4:
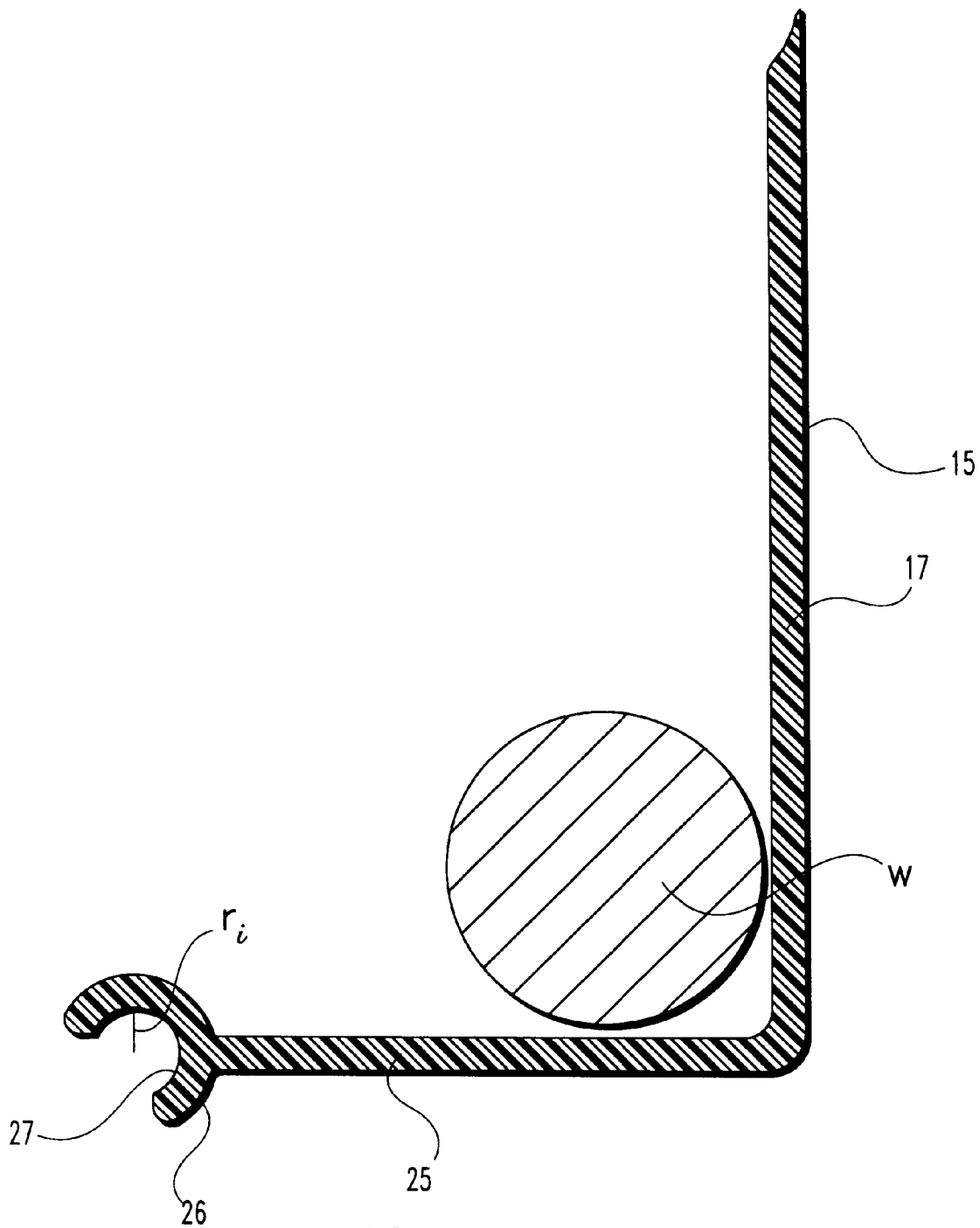
FIG. 4 is a partial side sectional view of an electrical raceway.
Figure 5:
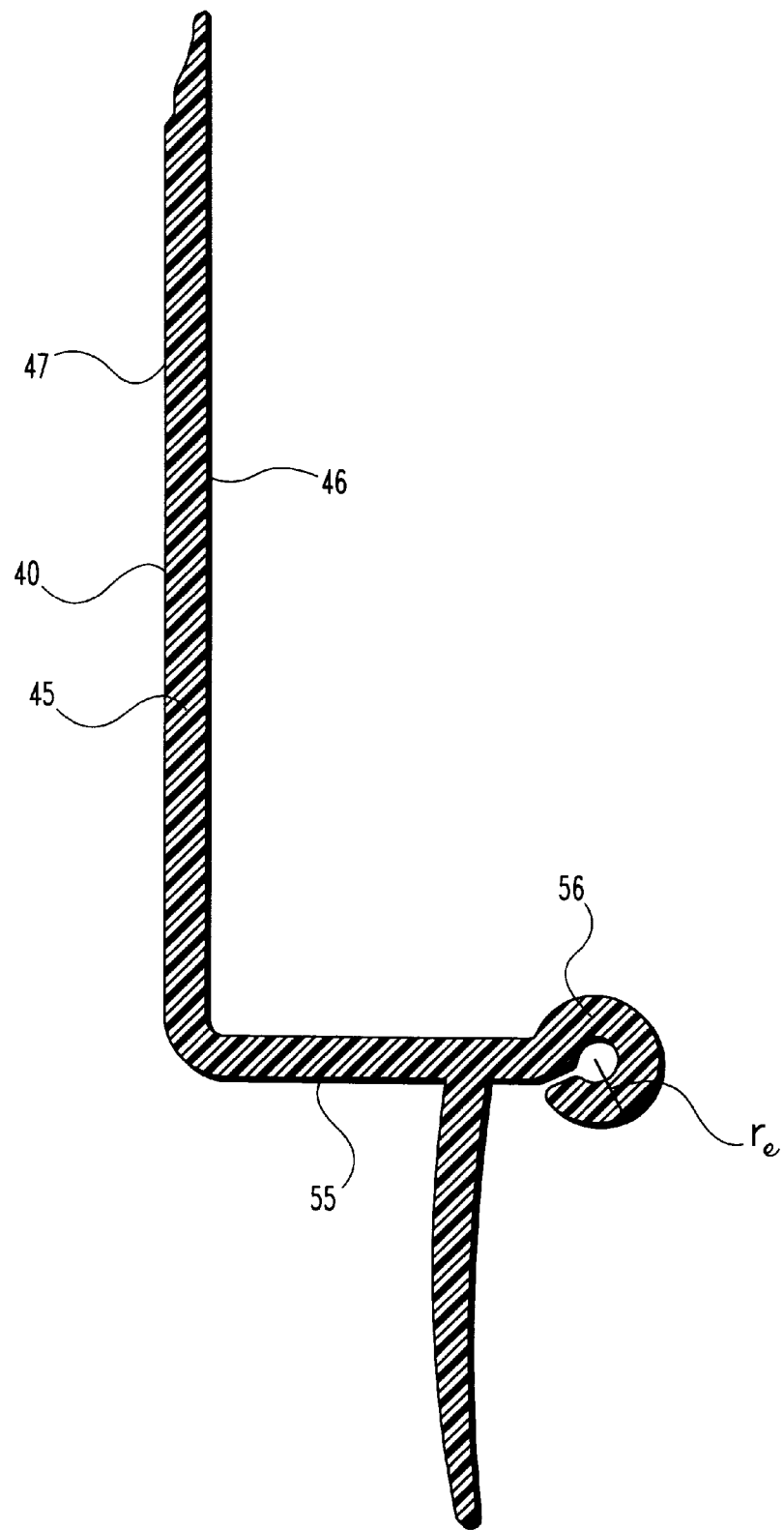
FIG. 5 is a partial side sectional view of a cover for an electrical raceway.

In the embodiment shown in FIGS. 1 and 3, the other side wall 20 of the raceway 15 terminates in an elongated attachment receptacle 26 and the attachment means of the cover 40 includes a rounded edge 56 of the second portion 55. In the particular embodiment shown in FIGS. 1 and 3, the wall 57 of the second portion 55 is curled to form the rounded edge 56. The edge 56 is receivable within the attachment receptacle 26 and is configured for snap fit engagement within the receptacle 26. Preferably, the attachment receptacle 26 defines a curved interior portion 27 having an internal radius $r_i$ slightly larger than the radius $r_e$ of the rounded edge 56 of the second portion 55 for mating with the rounded edge 56 as depicted in FIGS. 4 and 5.

Figure 6:
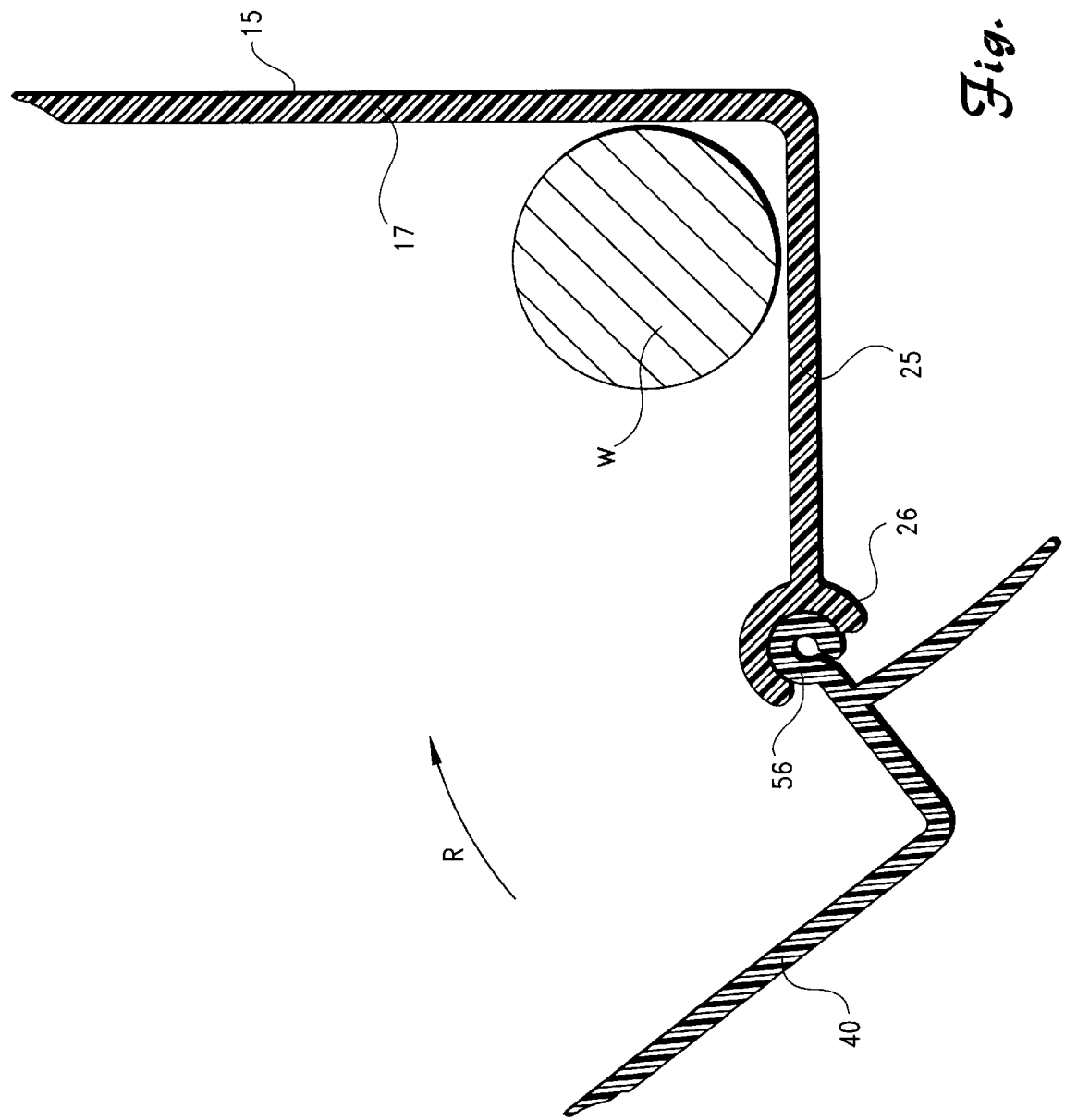
FIG. 6 is a partial side sectional view of an electrical raceway assembly according to one embodiment of the present invention.

Preferably, the rounded edge 56 is rotatingly receivable within the attachment receptacle 26 to facilitate snap fit engagement of the cover 40 to the raceway 15. In operation, the second portion 55 is first engaged to the raceway 15 at an angle that facilitates inserting the rounded edge 56 into the attachment receptacle 26 as shown in FIG. 6. The cover 40 is then rotated along the longitudinal axis $A_r$ (FIG. 2) of the receptacle 26 in the direction of arrow R until the groove 51 of the first portion 50 contacts the lip 21 of the side wall 20 and the lip 21 is forced into engagement with the receptacle 26 as shown in FIG. 1. The raceway 15 can be conveniently accessed without completely disengaging the cover 40 from the raceway 15. The lip 21 is removed from the receptacle 26 and then the cover 40 rotated in a direction opposite to direction of arrow R. After access is completed, cover 40 is closed as described.

A flange 60 extends from an end of the cover 40 and along the length l of the cover 40. The flange 60 provides a pass through for excess cord stored in the area a behind the flange 60 to provide a neat and pleasing work space. In the embodiment of FIG. 3, the flange 60 extends from and is adjacent to the second portion 55 of the cover 40.

Referring again to FIG. 1, the flange 60 is preferably integral with the face plate 45. In some embodiments, the flange 60 is recessed from the face plate 45. The flange 60 occludes an area a behind the flange 60 when the cover 40 is attached to the raceway 15. The flange 60 is relatively more flexible or pliable than other elements of the cover 40, which must be sufficiently rigid to prevent inadvertent detachment from the raceway 15. The flange 60 is elastically deformable to allow convenient access to the area a for storage of wires on the surface of the structure. That is, upon a pulling or pushing pressure, the flange 60 is deformable from its original shape shown in FIG. 1 to a deformed shape that exposes area a. The flange 60 than returns to its original, undeformed state when the deformation force is removed. The relative difference in rigidity allows the flange 60 to bend relative to other stiffer portions of the cover 40 so that the flange 60 is deformable while the cover 40 remains stationary and engaged to the raceway 15.

Providing an elastically deformable flange 60 integrally formed with a face plate 45 that is sufficiently rigid to maintain engagement with the raceway 15 can be accomplished by a dual durometer cover 40. The flange 60 preferably has an average durometer which is relatively lower than the average durometer of other elements of the cover 40, such as the face plate 45 and/or the first and second portions 50, 55 of the cover 40. It is contemplated that the flanges 60 will be made of a thermoplastic material having a durometer of less than about Shore 80, preferably from about Shore 30 to about Shore 50, and other portions of the cover 40 will preferably be made of a thermoplastic material having a durometer at least about 15 units greater within the range of about Shore 65 to about Shore 95, preferably from about Shore 80 to about Shore 90. All durometer measurements are in accordance with ASTMD 224D Shore A, 15 second delay. The dual durometer covers of this invention can be obtained using methods known in the art, such as co-extrusion processes.

Figure 2:
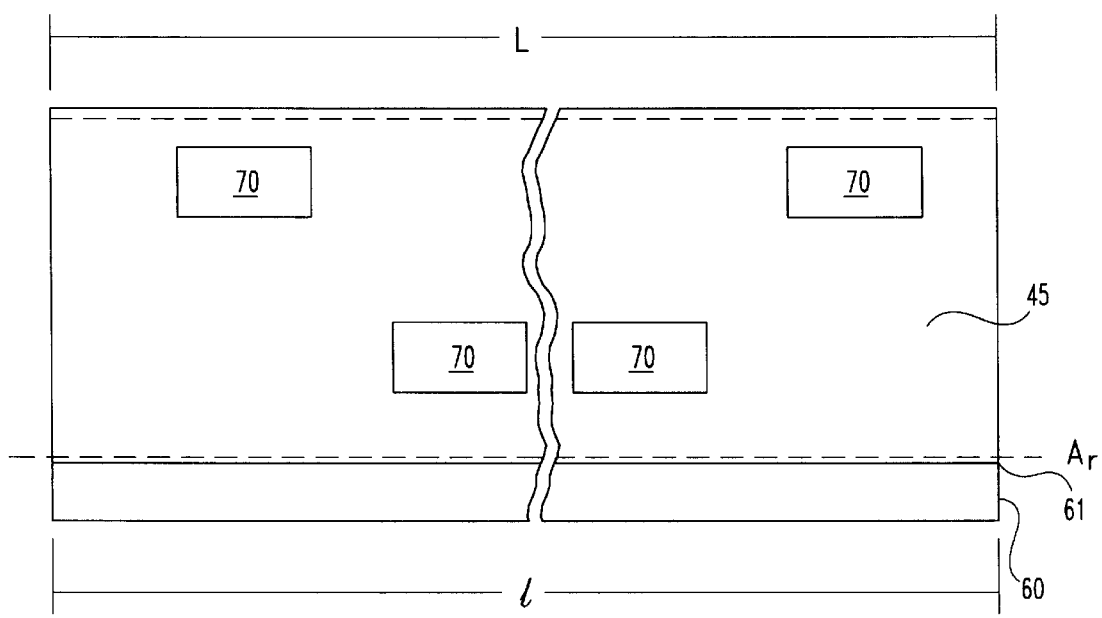
FIG. 2 is a front elevational view of an electrical raceway assembly.

Although a distinct line 61 is shown in FIGS. 1 and 2, between face plate 45 and flange 60, there need not be an exact line between the higher durometer material and the lower durometer material. If thermoplastic materials of different durometers are extruded together as is contemplated in one embodiment of this invention, there will most likely be a fusing of the materials resulting in a certain amount of blending in the zones between the higher and lower durometer thermoplastic materials. The exact position of the line or zone of demarcation between higher and lower durometer material can vary upward or downward along flange 60 so long as the objects of the present invention are achieved. Moreover, the blend lines may be located at different locations on the cover 40 so long as portions of the cover 40 are sufficiently rigid to maintain engagement with the raceway 15. For example, FIG. 7 shows blend lines 53, 58 within the first portion 50' and the second portion 55' of the cover 40' so that the attachment means, such as the rounded edge 56', are relatively rigid while the flange 60' is relatively flexible.

The covers of the present invention may be formed of any suitable material that accomplishes the features of this invention. Preferably, the covers are composed of a thermoplastic material, including synthetic and natural rubbers, plastics and the like. The particular material of the covers is not critical so long as the covers have portions that are sufficiently rigid to maintain snap fit engagement with the raceway until a removal force is applied, and the flange 60 is elastically deformable to allow temporary access to an area behind the flange and then return to an undeformed state occluding the area.

Figure 7:
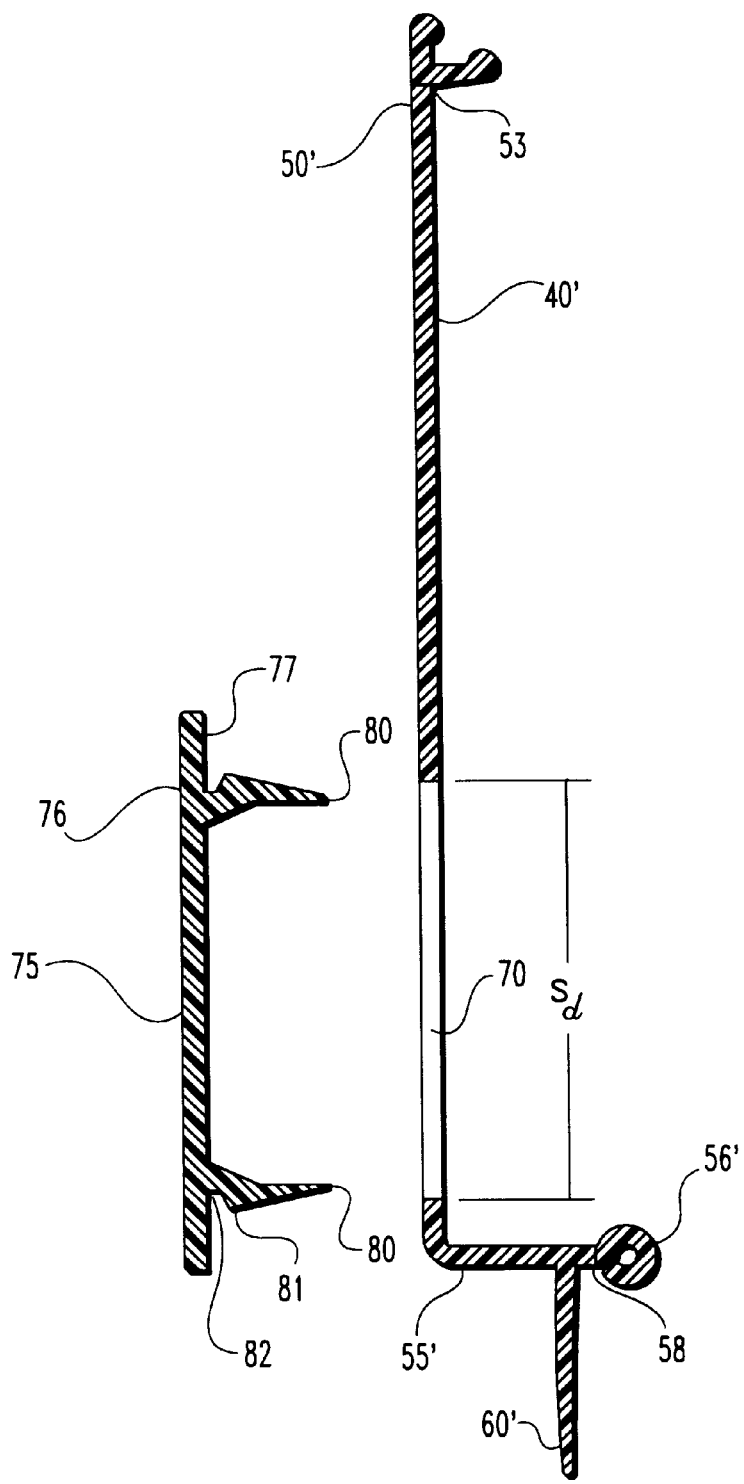
FIG. 7 is a side sectional view of a cover of this invention.
Figure 8:
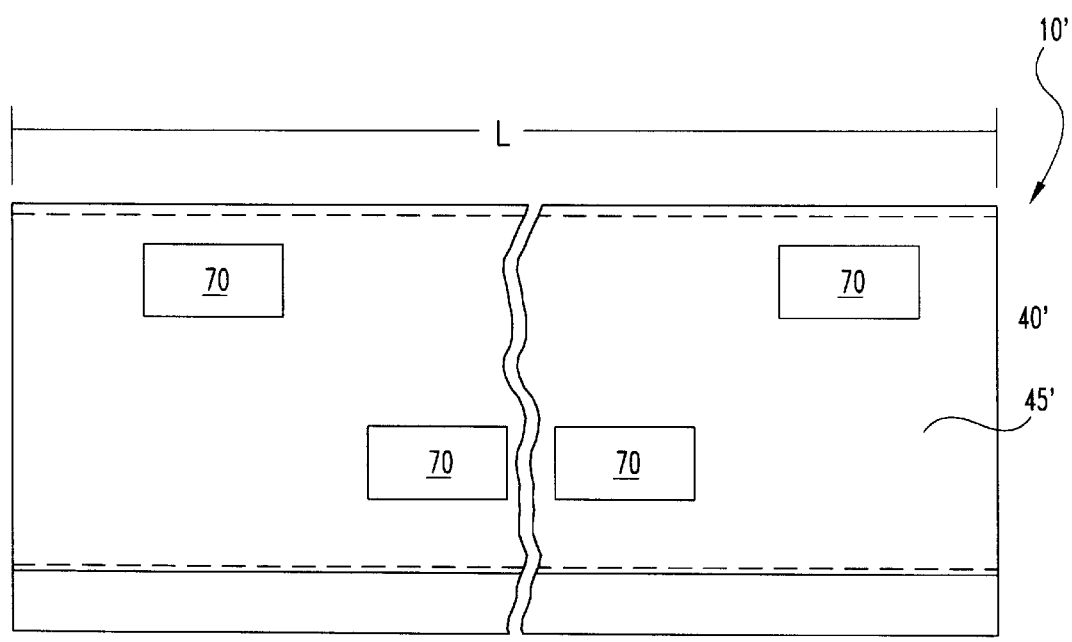
FIG. 8 is a front elevational view of an electrical raceway assembly.
Figure 9:
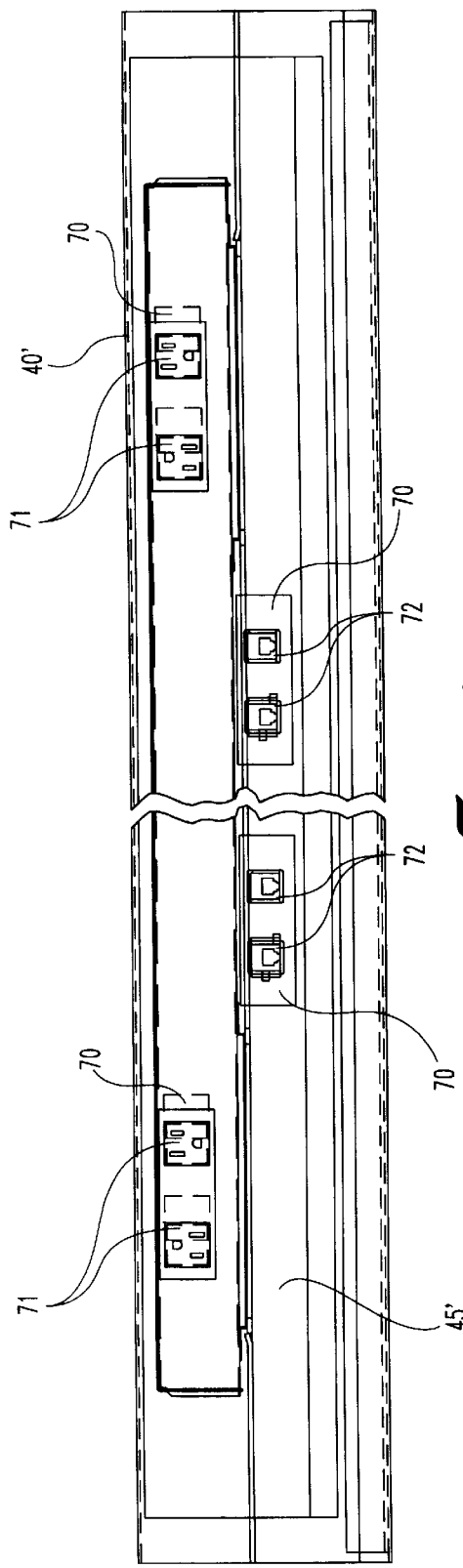
FIG. 9 is a front elevational view of an assembly according to one embodiment of this invention.

Referring now to FIGS. 7–9, in some embodiments, the face plate 45' of the cover 40' defines an access doorway 70 for accessing wires W, electrical outlets 71 and data jacks 72 disposed in the channel of the raceway. Preferably, the assembly 10' also includes a door 75 detachably attachable to the face plate 45' to occlude the doorway 70. The door 75 includes front face 76 and a back face 77 so that the back face 77 faces the channel 30 when the door 75 is attached to the doorway 70.

The assembly 10' preferably includes attachment means for detachably attaching the door 75 to the face plate 45'. In the embodiment shown in FIG. 7, the attachment means includes a pair of oppositely spaced latch members 80 projecting outwardly from the back face 77. In this embodiment, the latch members 80 are perpendicular to a plane of the door 75. Each of the latch members 80 has a shoulder portion 81 facing the back face 77 and a groove 82 between the back face 77 and the shoulder portion 81.

Figure 10:
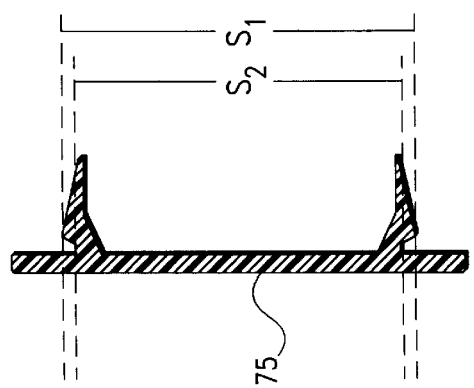
FIG. 10 is a side sectional view of a door for a face plate access doorway according to one embodiment of the present invention.

Referring now to FIGS. 7 and 10, the latch members 80 are configured for snap fit engagement within the doorway 70. Each pair of shoulder portions 81 together defines a first dimension $S_1$ that is larger than a second dimension $S_2$ formed between each pair of grooves 82. The first dimension $S_1$ is larger than a length $S_d$ of the doorway 70 and the second dimension $S_2$ is slightly smaller than the length $S_d$ of the doorway 70 so that the door 75 is snap fittable within the doorway 70 to occlude the doorway 70.

Preferably, there is a difference in rigidity between the latch members 80 and the face plate 45' to allow the shoulder portions 81 to be forced past the smaller dimensioned doorway 70. In one embodiment, the face plate 45' is relatively more flexible than the latch members 80. This may be accomplished by using materials having characteristics that influence rigidity such as thickness and durometer. For example, the face plate 45' may have an average durometer that is relatively lower than the average durometer of the door 75.

In this embodiment, the door 75 is substantially or nearly flush to the face plate 45 so that the assembly 10' has a smooth and streamlined appearance, which does not detract from the overall aesthetics and appearance of the work space. At the same time, each of the doors 75 can be can be opened as desired to provide convenient access to portions of the raceway channel 30' so as to permit access to power blocks or communication cables therein.

Figure 11:
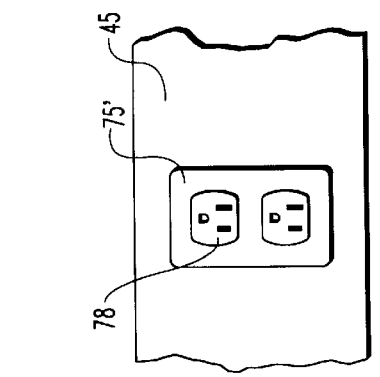
FIG. 11 is a partial front elevational view of a cover and door according to one embodiment of this invention.

In some embodiments as shown in FIG. 11, door 75' may be provided with additional features, such as electrical outlets 78, six-pin telephone jacks, eight-pin keyed telephone jacks, BNC coaxial data connectors, dual-coaxial connectors, TNC coaxial data connectors, subminiature D 25-pin data connectors for twisted pair or ribbon cable, connectors for fiber optic cables and the like.

Figure 12:
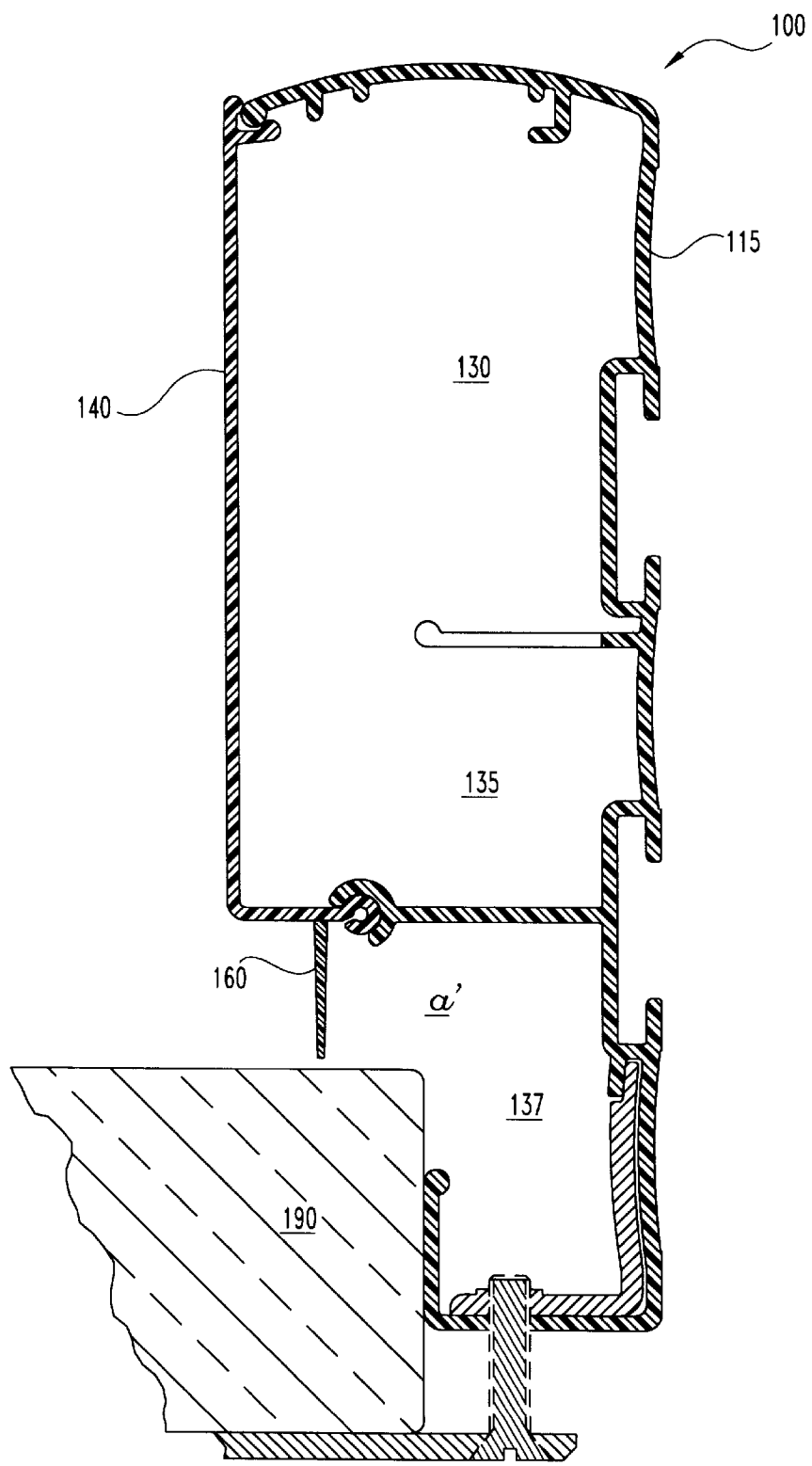
FIG. 12 is a side sectional view of an electrical raceway assembly according to one embodiment of this invention.
Figure 13:
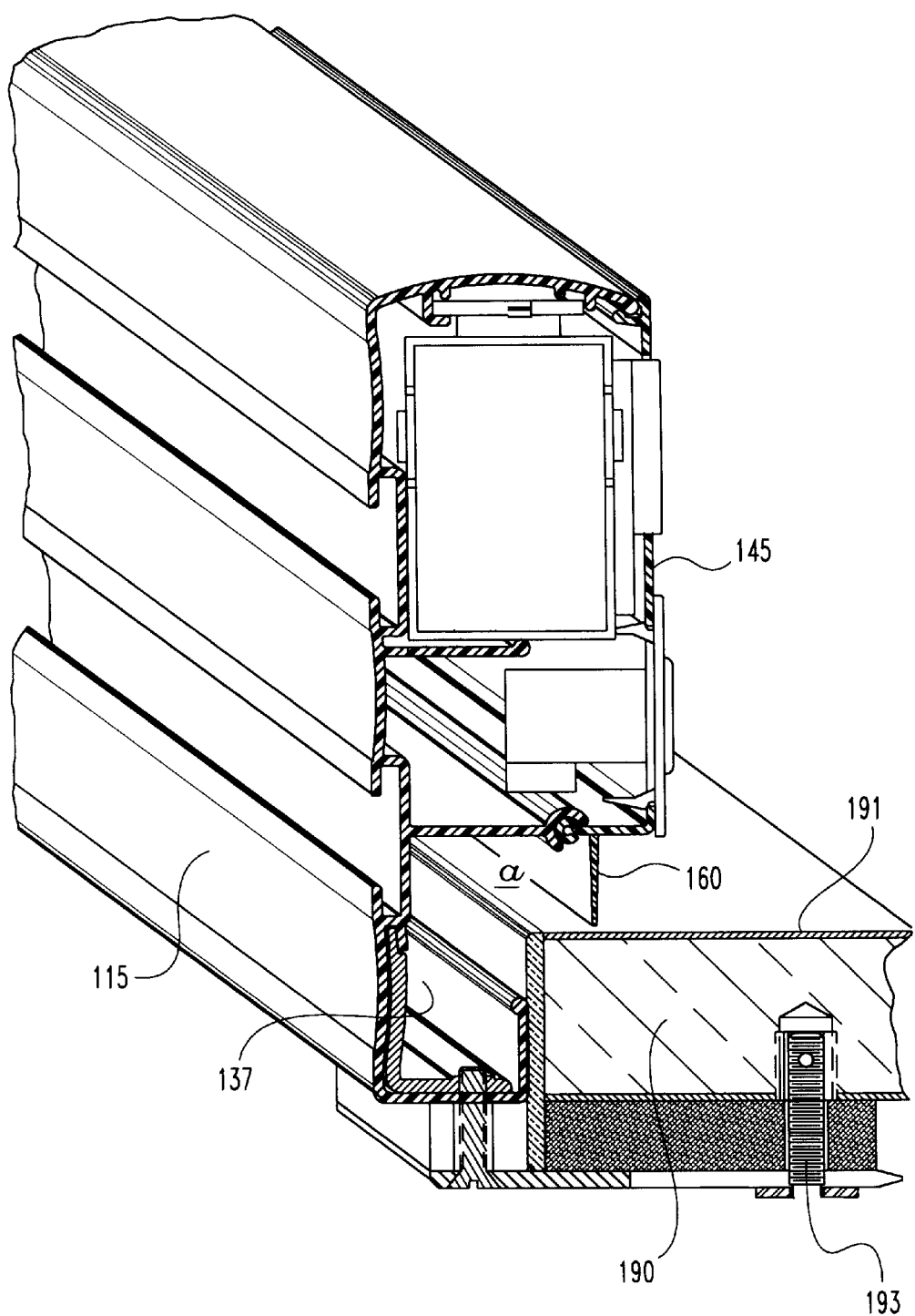
FIG. 13 is a partial sectional view of an assembly of this invention engaged to the top of a structure.

In preferred embodiments, the raceway 115 defines at least one other channel 135 in addition to the first channel 130 as shown in FIG. 12. In some cases it is desirable to house electrical wires in one channel and communication wires in another. In this assembly 100, the raceway 115, also includes an open track channel 137 that defines an area a'. Area a' is partially occluded by flange 160 when the cover 140 is attached to the raceway 115. In this preferred embodiment, the flange 160 contacts or approaches the surface 191 of the structure, such as a desk or table 190 as depicted in FIG. 13. The flange 160 provides a visible seal between the face plate 145 and the surface 191 yet allows access to the open channel 137 to store cords from tools, such as a computer or phone, on the table 190. The open channel 137 can also be used as an additional guide for wires and cords to desk top tools.

Figure 14:
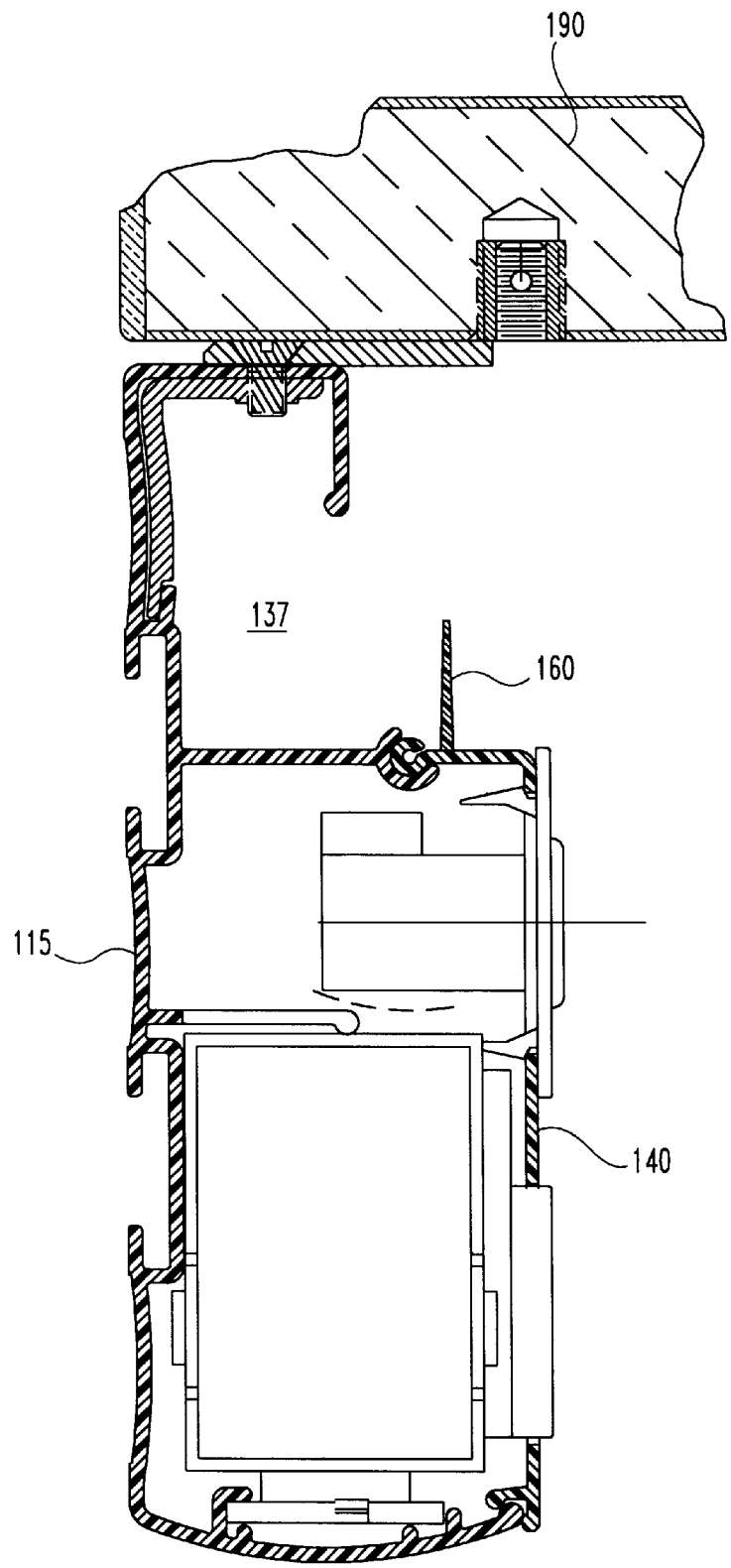
FIG. 14 is a partial sectional view of an assembly of this invention engaged to the underside of a structure.
Figure 15:
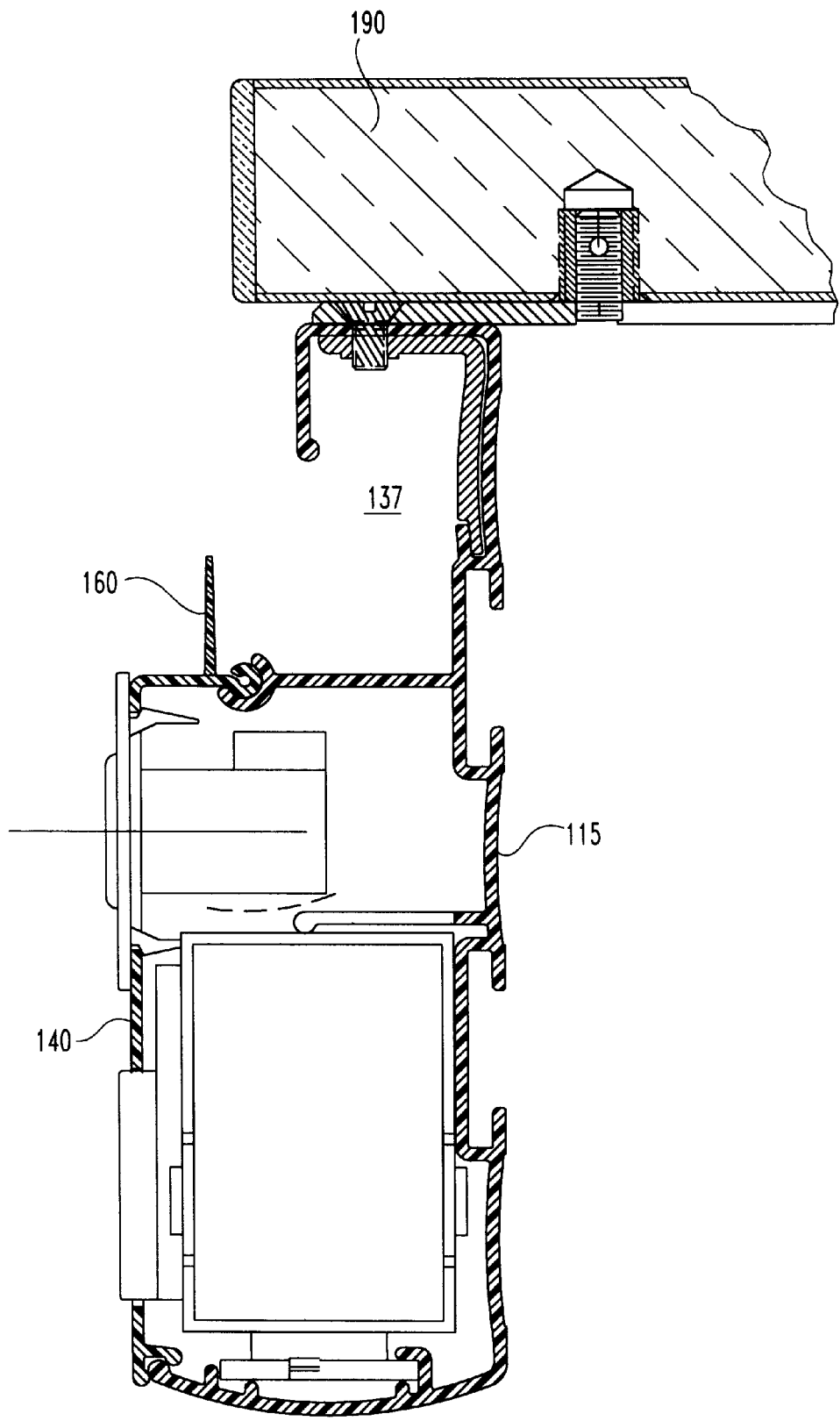
FIG. 15 is a partial sectional view of an assembly of this invention engaged to the underside of a structure.
Figure 1:
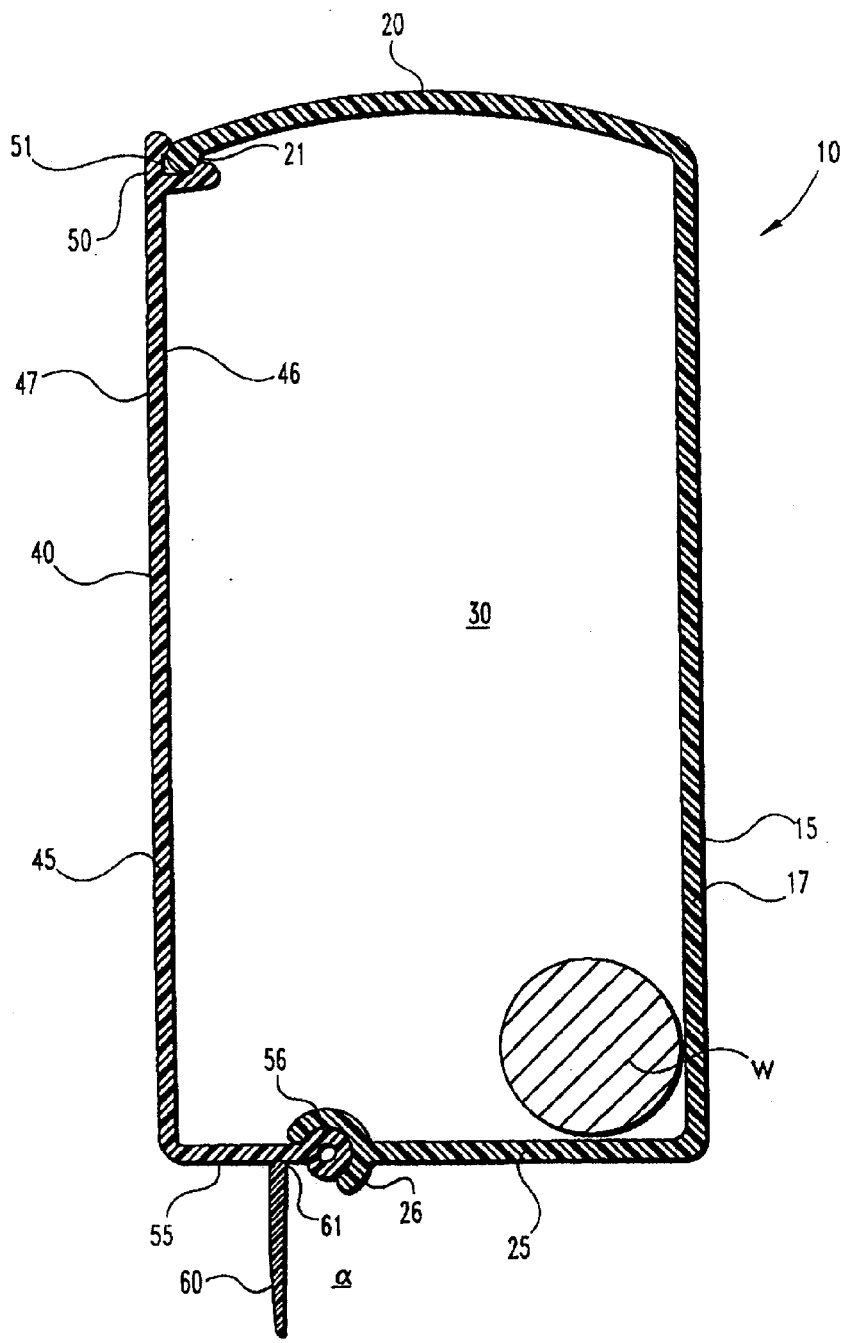
Figure 4:
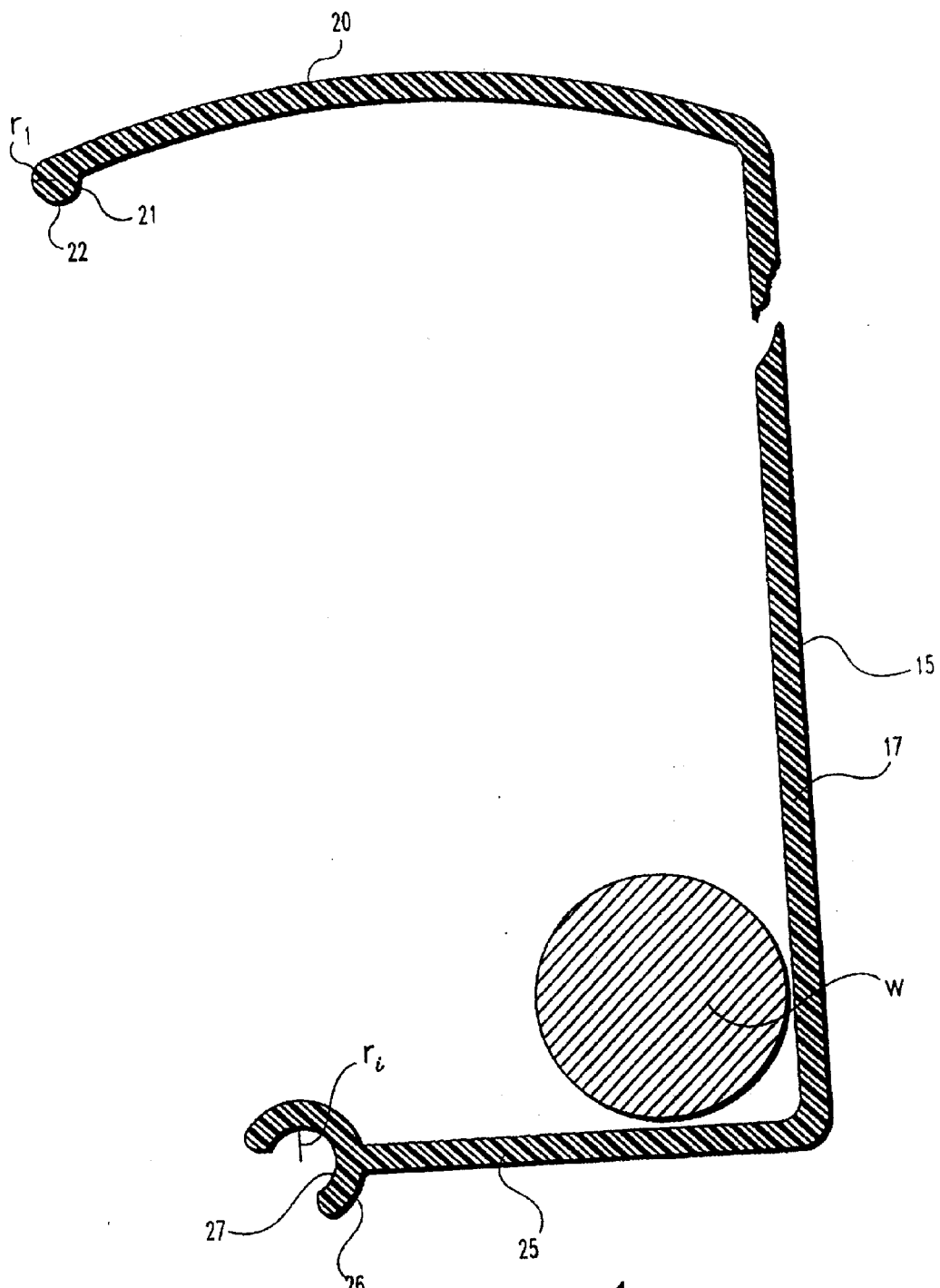

As shown in FIG. 13, raceway 115 is fastened to the surface 191 of a desk, wall, baseboard, or other suitable structure with a suitable fastener 193. In this embodiment, the raceway 115 and cover 140 form a back panel to the structure 190. The assemblies of this invention may also be fastened below the structure 190 to serve as a modesty panel as shown in FIGS. 14 and 15. In FIG. 14, the open channel 137 is exposed to the area beneath the structure 190. This configuration is useful in structures defining grommets (not shown) through the surface for wires to extend from the open channel 137, through the grommet to the surface 191 of the structure 190. In FIG. 15, the open channel 137 is open behind the structure 190. This configuration can be used to deliver wires from the open channel 137 to the back of the structure 190 and onto the surface 191. In embodiments similar to those shown in FIGS. 14 and 15, it may be desirable to lengthen the flange 160 to further occlude the open channel 137 yet still allow access. In still other embodiments, the assembly 100 can be incorporated into other structures, such as a wall panel. The flange 160 can be positioned to contact or approach the floor for capturing excess cords.

The raceways of this invention are preferably formed of a suitable rugged sheet metal material capable of being easily formed and shaped but not readily bent or abused. Any suitable tough, resilient material which possesses form-sustaining rigidity upon being formed and which exhibits sufficient flexibility to provide the connection upon installation as described may be used to form the assembly.

The present invention economically and conveniently provides accommodations for electronic equipment in work spaces, which enhance the utility of office structures. The raceway assemblies of this invention guide wires to their outlets and provide table top access to power supply and communication ports. The devices of the present invention enhance the utility of office structures in an aesthetically pleasing manner and improve the quality of the work environment.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

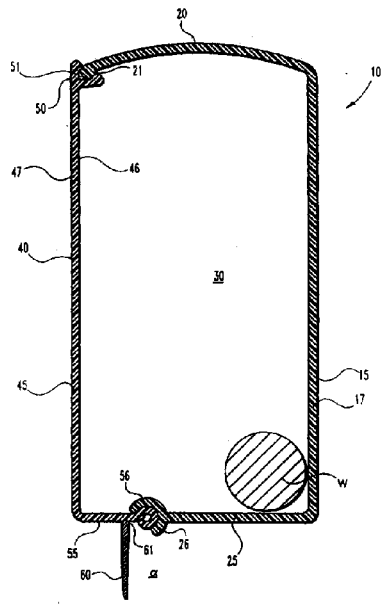

What is claimed:

1. An electrical raceway assembly for use with a structure, comprising:
    an elongated raceway engageable to the structure and having a length, a transverse base and a pair of opposite upstanding sidewalls extending along said length to define at least one channel configured for retaining electrical wires;
    a cover attachable to said raceway to occlude at least a portion of said at least one channel, said cover including
        an elongated face plate having an interior surface and an exterior surface, said face plate further having a first portion and an opposite second portion, each said portion extending along a length of said face plate and
        attachment means for attaching said first and second portions of said face plate to each of said opposite upstanding sidewalls so that said interior surface faces said channel; and
    a flange extending from one of said portions of said cover, said flange being relatively more flexible than said cover, said flange occluding an area behind said flange when said cover is attached to said raceway and said flange being elastically deformable to allow access to the area.

2. The assembly of claim 1 wherein said flange is integral with said face plate.

3. The assembly of claim 1 wherein
    a first of said side walls of said raceway terminates in a lip, said lip including a rounded surface having a radius; and
    said attachment means of said cover includes a groove defined in said first portion configured for snap fit engagement with said lip.

4. The assembly of claim 3 wherein:
    a second of said side walls of said raceway terminates in an elongated attachment receptacle; and
    said attachment means of said cover includes a rounded edge of said second portion receivable within said attachment receptacle, said rounded edge configured for snap fit engagement within said attachment receptacle.

5. The assembly of claim 4 wherein said attachment receptacle defines a curved interior portion having an internal radius slightly larger than said radius of said rounded edge for mating with said rounded edge and said rounded edge is rotatingly receivable within said attachment receptacle.

6. The assembly of claim 4 wherein said flange is adjacent said second portion of said face plate.

7. The assembly of claim 1 wherein one of said side walls of said raceway terminates in an attachment receptacle and said attachment means of said cover includes a rounded edge having a radius snap fittable into said attachment receptacle.

8. The assembly of claim 1 wherein said flange is recessed relative to said face plate.

9. The assembly of claim 1 wherein said face plate defines an access doorway for accessing wires and outlets disposed in said channel.

10. The assembly of claim 9, further comprising a door detachably attachable to said face plate to occlude said doorway, said door having a front face and a back face, said back face facing said channel when said door is attached to said doorway.

11. The assembly of claim 10 further comprising door attachment means for detachably attaching said door to said face plate.

12. The assembly of claim 11 wherein said door attachment means includes a pair of oppositely spaced latch members projecting outwardly from said back face and perpendicularly to a plane of said door, each said latch member having a shoulder portion facing said back face and a groove between said back face and said shoulder portion, said shoulder portions defining a first dimension which is larger than a second dimension formed between said pair of grooves, said first dimension larger than a length of said doorway, said second dimension slightly smaller than said length so that said door is snap fittable within said doorway to occlude said doorway.

13. An electrical raceway assembly wherein said raceway defines for use with a structure, comprising:
    an elongated raceway engageable to the structure and having a length, a transverse base and a pair of opposite upstanding sidewalls extending along said length to define at least one channel configured for retaining electrical wires and a second channel parallel to said at least one channel;
    a cover attachable to said raceway to occlude at least a portion of said at least one channel, said cover including
        an elongated face plate having an interior surface and an exterior surface, said face plate further having a first portion and an opposite second portion, each said portion extending along a length of said face plate and
        attachment means for attaching said first and second portions of said face plate to each of said opposite upstanding sidewalls so that said interior surface faces said channel; and
        a flange extending from one of said portions of said cover, said flange being relatively more flexible than said cover, said flexible flange configured to occlude at least a portion of said second channel when said cover is attached to said raceway, and said flange being elastically deformable to allow access to said portion of said second channel.

14. A dual durometer cover for occluding channels in an electrical wire raceway, comprising:

an elongated face plate having an interior surface and an exterior surface, said face plate further having a first portion and an opposite second portion;

each of said portions defining an attachment element for attaching said face plate to an end of each said upstanding sidewall so that said interior surface faces said channel; and a flexible flange extending from one of said portions of said cover, said flange having an average durometer relatively lower than the average durometer of said face plate, said flange occluding an area behind said flange when said cover is attached to said raceway and said flange elastically deformable to allow access to the area.

15. The cover of claim 14 wherein said flange is recessed relative to said face plate.

16. The cover of claim 15, wherein said face plate defines an access doorway and further comprising a door detachably attachable to said face plate to occlude said doorway, said door having a front face and a back face.

17. The assembly of claim 16 wherein said door includes a pair of oppositely spaced latch member projecting outwardly from said back face perpendicularly to a plane of said door, each said latch member having a shoulder portion facing said back face and a groove between said back face and said shoulder portion, said shoulder portions defining a first dimension which is larger than a second dimension formed between said pair of grooves, said first dimension larger than a length of said doorway, said second dimension slightly smaller than said length so that said door is snap fittable within said doorway to occlude said doorway.

18. The assembly of claim 17 wherein said face plate has an average durometer relatively lower than an average durometer of said latch members.

19. A cover for an electrical wire raceway having a transverse base, a pair of opposing upstanding side walls, and a number of channels along its length, said cover comprising:

an elongated face plate having an interior surface and an exterior surface, said face plate further having a first portion and an opposite second portion, each said portion extending along a length of said face plate, each of said portions defining an attachment element for attaching said face plate to an end of each upstanding sidewall of the raceway so that said interior surface faces at least one of the channels in the raceway, and a flexible flange extending from one of said portions of said cover, said flange being relatively more flexible than said face plate, said flange occluding an area behind said flange when said cover is attached to said raceway and said flange elastically deformable to allow access to the area.

20. The cover of claim 19, wherein said face plate defines an access doorway and further comprising a door detachably attachable to said face plate to occlude said doorway, said door having a front face and a back face.

21. The cover of claim 20 wherein said door includes a pair of oppositely spaced latch member projecting outwardly from said back face perpendicularly to a plane of said door, each said latch member having a shoulder portion facing said back face and a groove between said back face and said shoulder portion, said shoulder portions defining a first dimension which is larger than a second dimension formed between said pair of grooves, said first dimension larger than a length of said doorway, said second dimension slightly smaller than said length so that said door is snap fittable within said doorway to occlude said doorway.

22. The cover of claim 21 wherein said latch members are relatively more rigid than said face plate.

23. A combination, comprising:

a table;

an elongated raceway defining at least one channel configured for retaining electrical wires;

means for mounting said raceway to said table to define an area between said raceway and said table; and a cover attachable to said raceway, said cover including;
an elongated face plate;
attachment means for attaching said face plate to said raceway to occlude at least a portion of said at least one channel; and
a flange extending from said faceplate, said flange being relatively more flexible than said faceplate, said flange occluding at least a portion of said area between said raceway and said table when said cover is attached to said raceway and said flange being elastically deformable to allow access to said area between said raceway and said table.

24. The combination of claim 23 wherein said attachment means includes a hinge.

25. The combination of claim 23 wherein said attachment means includes a lip and a groove defined between said raceway and said cover configured for snap fit engagement.

26. The combination of claim 23 wherein said cover includes a hinge at one edge and is configured for snap fit engagement at its other edge.

27. The combination of claim 26 wherein said flange is disposed adjacent said hinge.

28. The combination of claim 26 wherein said cover is L-shaped and said L-shaped cover has a first portion including said faceplate and a generally perpendicular second portion including said hinge, and said flange is attached to said second portion.

29. The combination of claim 28 wherein said flange is recessed relative to said first portion.

30. The combination of claim 29 wherein said flange is disposed adjacent said hinge.

31. The combination of claim 23 wherein said raceway has a transverse base and a pair of opposite upstanding side walls, and said mounting means includes:

a mounting flange integral with said base of said raceway and extending beyond one of said upstanding side walls;

a first bracket to reinforce said mounting flange, said bracket being L-shaped; and a second bracket configured for engagement of said mounting flange to said table.

* * * * *

UNITED STATES PATENT AND TRADEMARK OFFICE
CERTIFICATE OF CORRECTION

PATENT NO.    : 6,137,057
DATED         : October 24, 2000
INVENTOR(S)   : Gutgsell It is certified that error appears in the above-identified patent and that said Letters Patent is hereby corrected as shown below:

<u>Title page,</u>
The title page showing an illustrated figure, should be deleted and substituted therefor the attached title page.

<u>Drawings,</u>
Delete drawing sheets 1 and 4, and substitute therefor the drawing sheets consisting of drawing Figs. 1 and 4, as shown on the attached sheets.

Signed and Sealed this

Seventeenth Day of December, 2002

JAMES E. ROGAN
*Director of the United States Patent and Trademark Office*

United States Patent [19]

Gutgsell

[11] Patent Number: 6,137,057

[45] Date of Patent: Oct. 24, 2000

[54] ELECTRICAL RACEWAY ASSEMBLY

[75] Inventor: David R. Gutgsell, Jasper, Ind.

[73] Assignee: Ditto Sales, Inc., Jasper, Ind.

[21] Appl. No.: 09/082,128

[22] Filed: May 20, 1998

[51] Int. Cl.[7] .................................................. H02G 3/00
[52] U.S. Cl. ..................................... 174/101; 174/68.3
[58] Field of Search ............................. 174/68.1, 68.3, 174/95, 96, 97, 98, 100, 101

[56] References Cited

U.S. PATENT DOCUMENTS

| | | |
|---|---|---|
| 3,786,171 | 1/1974 | Shira ........................................ 174/48 |
| 4,017,137 | 4/1977 | Parks . |
| 4,188,765 | 2/1980 | Jackson . |
| 4,277,123 | 7/1981 | Haworth et al. . |
| 4,370,008 | 1/1983 | Haworth et al. . |
| 4,372,629 | 2/1983 | Propst et al. . |
| 4,377,724 | 3/1983 | Wilson . |
| 4,382,986 | 5/1983 | Reuben . |
| 4,406,101 | 9/1983 | Heidmann ................................. 52/220 |
| 4,594,826 | 6/1986 | Gray . |
| 4,717,358 | 1/1988 | Chaundy . |
| 4,762,072 | 8/1988 | Boundy et al. . |
| 4,792,881 | 12/1988 | Wilson et al. . |
| 4,874,322 | 10/1989 | Dola et al. . |
| 4,918,886 | 4/1990 | Benoit et al. . |
| 5,024,614 | 6/1991 | Dola et al. . |
| 5,091,607 | 2/1992 | Stob ......................................... 174/48 |
| 5,092,786 | 3/1992 | Juhlin et al. . |
| 5,092,787 | 3/1992 | Wise et al. . |
| 5,231,562 | 7/1993 | Pierce et al. . |
| 5,244,401 | 9/1993 | Russell et al. . |
| 5,336,097 | 8/1994 | Williamson et al. . |
| 5,373,108 | 12/1994 | Ysbrand . |
| 5,451,101 | 9/1995 | Ellison et al. . |
| 5,694,726 | 12/1997 | Wu ........................................ 52/287.1 |
| 5,704,175 | 1/1998 | Lewis . |
| 5,728,976 | 3/1998 | Santucci et al. ......................... 174/135 |
| 5,877,451 | 3/1999 | Zimmerman ............................ 174/68.3 |

Primary Examiner—Kristine Kincaid
Assistant Examiner—W. David Walkenhorst
Attorney, Agent, or Firm—Baker & Daniels

[57] ABSTRACT

An electrical raceway assembly for use with a structure is provided, including an elongated raceway engageable to the structure and having a length, a transverse base and a pair of opposite upstanding sidewalls extending along the length to define at least one channel configured for retaining electrical wires. A cover attachable to the raceway to occlude a portion of the channel is included. The cover includes an elongated face plate having an interior surface and an exterior surface. The face plate has a first portion and an opposite second portion. The cover is configured for snap fit engagement with the raceway. One end of the cover is rotatable, about a longitudinal axis of the raceway, between an open position in which a portion of a channel of the raceway is exposed and a closed position in which the other end of the cover is engaged to the raceway. A flange extends from one of the portions of the cover. The flange is relatively more flexible other elements of the cover and occludes an area behind the flange when the cover is attached to the raceway and the flange being elastically deformable to allow access to the area.

31 Claims, 13 Drawing Sheets